July 28, 1964 W. FROEDE 3,142,439
SEALING MEANS FOR ROTARY ENGINE
Filed April 26, 1962 2 Sheets-Sheet 1

INVENTOR.
WALTER FROEDE
BY
Thomas W. Kennedy
ATTORNEY

July 28, 1964 W. FROEDE 3,142,439
SEALING MEANS FOR ROTARY ENGINE
Filed April 26, 1962 2 Sheets-Sheet 2

INVENTOR.
WALTER FROEDE
BY
Thomas W. Kennedy
ATTORNEY

United States Patent Office 3,142,439
Patented July 28, 1964

3,142,439
SEALING MEANS FOR ROTARY ENGINE
Walter Froede, Neckarsulm, Wurttemberg, Germany, assignor to NSU Motorenwerke Aktiengesellschaft, Neckarsulm, Germany, and Wankel G.m.b.H., Lindau (Bodensee), Germany, both corporations
Filed Apr. 26, 1962, Ser. No. 190,295
Claims priority, application Germany May 10, 1961
5 Claims. (Cl. 230—145)

The present invention relates broadly to the art of rotary mechanisms and is particularly directed to sealing means for such rotary mechanisms.

The invention is particularly useful in connection with rotary mechanisms similar to that disclosed in U.S. Patent No. 2,988,065, although as will become apparent, this invention is not limited to this specific type of rotary mechanism. In the following description the invention is described in relation to an internal combustion engine, but the invention is also suitable for fluid pumps and fluid motors.

A rotary engine as disclosed in said patent comprises an outer body or housing having a cavity therein and an inner body or rotor disposed therein rotatable relative to the outer body, about an axis laterally spaced from, but parallel to the axis of said cavity. The inner body is journaled on an eccentric portion of a shaft which is co-axial with the outer body and journaled in bearings carried by the outer-body end wall. The outer body has axially-spaced end walls and a peripheral wall interconnecting the end walls to form said cavity; the inner surface of the cavity peripheral wall having a multi-lobed profile which preferably is basically an epitrochoid. The inner body has end faces disposed adjacent to said outer-body end walls for sealing co-operation therewith and has a peripheral surface with a plurality of circumferentially-spaced apex portions, each having a groove carrying a radially-movable seal preferably urged radially outwardly by a spring for sealing engagement with the multi-lobed inner surface of the outer-body peripheral wall to form a plurality of working chambers between the two bodies which vary in volume upon relative rotation of the two bodies.

In prior combustion engines of this type, after they have operated for a long time, apex seal chatter markings can sometimes be observed at specific places on the inner surface of the peripheral wall of the stationary outer body. The markings have the appearance of wave patterns having corresponding lengths which might be ascribed to one or more vibration causes. Some of the possible causes of these vibrations would include:

(a) The varying gas pressure in the groove and under the apex seal strip;

(b) Frictional forces between the rounded crest or outer edge of the apex seal strip and the inner surface of the outer-body peripheral wall;

(c) Frictional forces between the groove side walls and the seal strip sides;

(d) Distortion or roughness of the inner surface of the housing peripheral wall.

In the prior art form of apex seal strips, all seal strips are made alike with a similar size and arrangement. Hence, all such strips have a similar vibration or pattern of movement and react against the peripheral-wall inner surface substantially at the same places so that the resulting markings produced by each apex seal are alike in location and extent. Such markings are aggravated by repetition to produce so-called chatter marks on the peripheral-wall inner surface which may cause poor sealing and shorten the engine life.

An object of the present invention comprises the provision of a rotary combustion engine in which a novel apex seal arrangement is provided for the working chambers to maintain continuous and improved sealing during engine operation.

Specifcally, insteead of providing similar, equally-spaced seal strips, one at each apex portion, this invention provides dissimilar seal strips, one at each apex portion. Thus, the apex seal strips differ one from another in their mass, have unequal spacing in distance, and/or are inclined differently to the peripheral-wall inner surface. Such unequally-spaced, dissimilar strips have different vibration characteristics thereby reducing chatter marks on the outer-body inner surface.

A further object of the invention is to provide an improved seal arrangement of the working chambers comprising apex seal means in combination with intermediate seal elements. The intermediate seal elements are equally spaced one from another and the apex seal means are slanted or tilted differently one from another. Such apex seal means disposed with different tilt angles, have different vibration characteristics, thereby reducing chatter marks.

Another object of the invention is to improve sealing of the working chambers and decrease chatter marks on the outer-body inner surface by providing the apex seal means with springs having unequal strengths. The different springs vary the vibration characteristics of the apex seal strips in addition to their usual function of urging the strips radially outward in sealing engagement with the peripheral wall.

Other objects of the invention will become apparent upon reading the annexed detail description in connection with the drawing in which.

Figure 1:
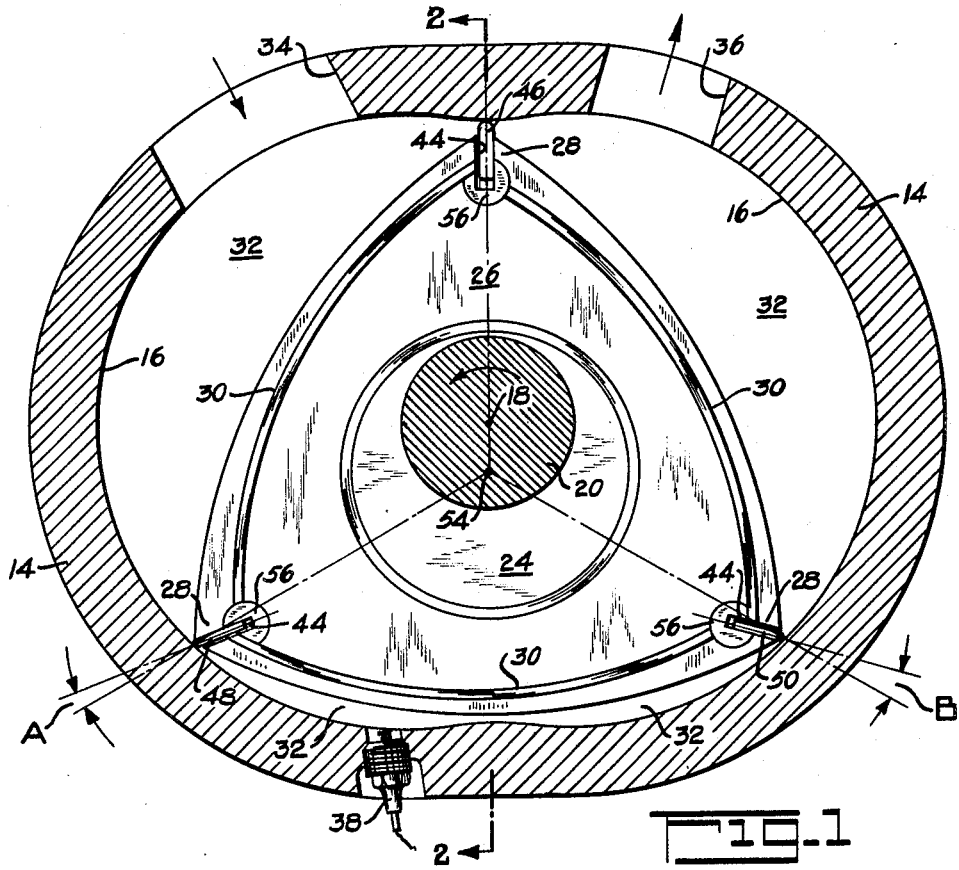
FIG. 1 is a schematic and elevation view of a rotary combustion engine embodying this invention.
Figure 3:
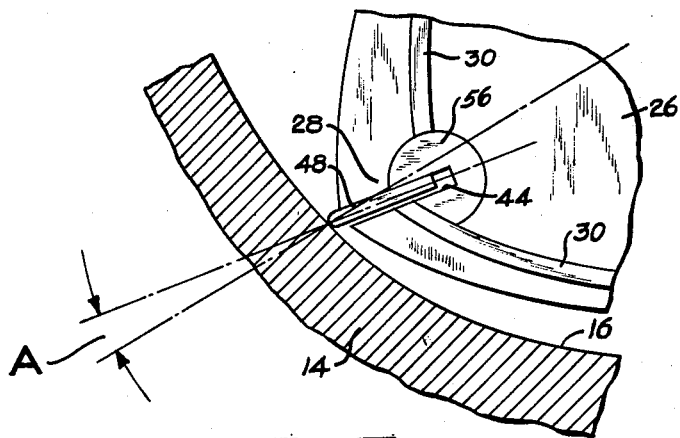
FIG. 3 is an enlarged view of a part of FIG. 1.
Figure 2:
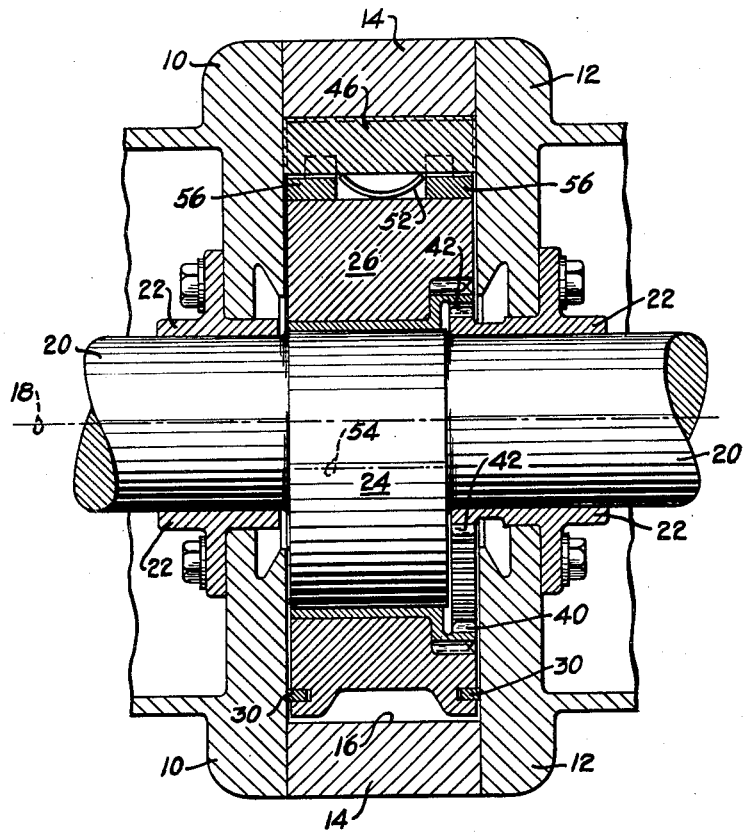
FIG. 2 is a longitudinal cross-sectional view of a rotary combustion engine taken along line 2—2 of FIG. 1.

Referring to the drawings, a rotary combustion engine is illustrated as comprising an outer body having spaced end walls 10 and 12 and a peripheral wall 14 disposed between and interconnecting said end walls to form a cavity therebetween. The inner surface 16 of the peripheral wall 14 has a multi-lobed profile which preferably is basically an epitrochoid having an axis 18 along which the end walls 10 and 12 are spaced.

A shaft 20, co-axial with the axis 18, extends through the outer body and is journaled in bearings 22 carried by the end walls 10 and 12. The shaft 20 has an eccentric portion 24 on which an inner body or rotor 26 is journaled. The inner body 26 has a plurality of apex portions 28 about its periphery, each of said apex portions having apex seal means, hereafter described, in sealing engagement with the peripheral wall inner surface 16. The inner body also has end faces having end seal means 30 and intermediate seal elements, hereafter described, disposed in sealing engagement with the end walls 10 and 12 to form a plurality of working chambers 32 which vary in volume upon rotation of the inner body 26 relative to the outer body.

The outer body has intake port means 34 for supply of an intake charge to the working chambers 32 and has exhaust port means 36 for discharge of the exhaust gases from the engine. If needed, a suitable spark plug 38 may be provided to ignite the intake charge.

In order to maintain the relative motion of the inner body 26 relative to the stationary outer body an internal gear 40 is, as illustrated, secured to the inner body co-axially with the inner body axis and is disposed in mesh with a fixed gear 42, as illustrated, secured to the outer body, said fixed gear being co-axial with the shaft 20.

The inner body 26 has an axis or center 54, and also has a plurality of circumferentially-spaced apex portions about its outer periphery. Each apex portion 28 has a groove 44 facing outwardly and running from one end face to the other of the inner body 26. At each apex portion 28 of the inner body 26 is an apex seal means or strip 46, 48 and 50, each received within its associated groove 44, and urged radially outward by spring means 52 into sealing engagement with the inner surface 16 of the peripheral wall 14. Each apex seal strip 46, 48 and 50 has at its radially outward or outer edge a rounded surface or crest, which is in contact with the peripheral-wall inner surface at a line.

The engine so far described is substantially similar to the engine disclosed in the aforementioned patent and reference is made to said patent for a more detailed description of said engine.

According to this invention the outer edges of the apex seal strips 46, 48 and 50 that bear against the inner surface 16 preferably are circumferentially spaced apart at unequal distances. In the illustrated embodiment of the invention, such non-uniform spacing is accomplished in conjunction with non-uniform tilting of the seals 46, 48 and 50, in a manner described hereinafter.

In addition, the apex seal strips 46, 48 and 50 have preferably unequal masses. The masses are made unequal by using a different material for each apex seal strip, or by using the same material but varying the strip thicknesses.

Furthermore, as a result of their different masses and unequal spacings, the apex seal strips 46, 48 and 50 have non-identical vibration characteristics. Each of the three apex seal strips 46, 48, 50 is subject to vibration while engaging a limited span of the peripheral wall inner surface 16, each revolution of the inner body 26. Because of the mentioned non-identical vibration characteristics, the three spans involved here are non-coincident.

With the aforementioned non-symmetrical spacing of the apex seal strips, the seal strips 48 and 50 are required to move radially during rotor rotation to maintain contact with the peripheral wall inner surface 16 whereas the seal strip 46 requires no such radial movement except for the small movements required because of manufacturing tolerances, bearing clearances, thermal distortions, etc. Hence, the friction between the seal strip 46 and the groove side wall approaches that of static friction while the friction between the seal strips 48, 50 and the groove side walls is a dynamic friction. This further contributes to providing the seal strips with different vibration characteristics.

As a further result, during engine operation, the apex seal strips 46, 48 and 50 make their chatter markings at different respective places on the peripheral wall inner surface 16, rather than making them at the same places as was the case in the prior art form of similar apex seal strips. Chatter marks, which are caused by repeated seal vibrations at the same place, are thereby avoided by the apex seal strips 46, 48 and 50 of the invention, and engine life is prolonged.

As illustrated in the drawings, each end of each apex seal strip 46, 48 and 50 is in sealing co-operation with an intermediate seal element 56. Each intermediate seal element 56 is received within its associated inner-body apex groove 44, is axially-movable, and slides over the adjacent surfaces of the outer-body end wall 10 or 12. Between the intermediate seal elements 56 disposed at a pair of adjacent apex portions 28 and associated with a working chamber 32, there extends end-face-sealing and end-wall-engaging seal means or strips 30, such that each end face strip 30 terminates at its own two intermediate seal elements 56. The end face strips 30 are also axially-movable and disposed on the end faces of the inner body 26. The intermediate seal elements 56 are equally spaced circumferentially about the inner body.

Thus, the end face strips 30 are all of equal length, permitting interchanging therebetween, for easier manufacture and maintenance.

Each apex seal strip 46, 48 and 50 is disposed respectively, at an angle of tilt 0°, A or B, relative to the radius to its outer edge, which angle is different from that of the other apex seal strips. This tilt angle 0°, A or B for the apex seal strips is the dihedral angle formed by the intersection, at the outer edge of a particular apex seal strip, of the middle longitudinal section plane of such seal strip, and of a radial plane passing through the inner body center 54. As illustrated, the seal strip 46 as a 0° tilt angle, while the seal strips 48, 50 have tilt angles A, B which not only are of different magnitude but are such that their seal strips 48, 50 are oppositely inclined relative to the direction of rotor rotation.

Therefore, the outer edges of the apex seal strips 46, 48 and 50 are unequally spaced, although the intermediate seal elements 56 are equally spaced. Also, the provision of non-uniform tilt angles, 0° or A or B, results in different friction of each strip with the side wall of its groove 44, thereby further causing the apex seal strips to have different vibration characteristics and place of vibration occurrence relative to the peripheral-wall inner surface 16.

Considering the condition of any fixed reference point on the peripheral-wall inner surface 16, during one rotation of the inner body 26, each of the three apex seal strips 46, 48 and 50 successively slide over this reference point. Each apex seal strip 46, 48 and 50, due to its different tilt angle, makes a different angle with a tangent to the inner surface 16 or with the path of the strip. Accordingly, the force perpendicular to the inner surface at this reference point as applied by each apex seal strip 46, 48 and 50 is different, so that the frictional force acting along the tangent to the reference point is different for each apex seal strip. Hence, the tilting moments caused by the frictional forces for each apex seal strip 46, 48 and 50 are different, and said different tilting moments also cause each apex seal strip 46, 48 and 50 to have different vibration characteristics during engine operation.

The outwardly-directed force on each apex seal strip varies as an apex seal strip 46, 48 or 50 moves through one rotation of the inner-body, due in large degree to the change in gas pressures in its adjacent working chambers 32. When the higher pressure in the two working chambers 32 adjacent an apex seal strip shifts from one chamber to the other; said seal strip shifts contact from one wall of its groove 44 to the other. During this transition period when the seal strip is out of contact with its groove side walls it is unstable and subject to vibration or chatter against the peripheral wall inner surface.

Spring means 52, received within each rotor apex groove 44, and preferably having unequal strengths, urge their associated apex seal strips 46, 48 or 50 radially outward. Each spring means 52 exerts a different outwardly-directed force through its associated apex seal strip 46, 48 or 50 against the peripheral-wall inner surface 16, to further vary the vibration characteristics of the seal strips. The same effect from the springs 52 can be achieved by springs of equal strength which are prestressed differently at assembly.

The various improvements of the invention are usable singly or in combination to prevent the apex seal strips 46, 48 and 50 from causing repeated markings at the same places on the peripheral-wall inner surface 16 resulting in so-called chatter marks. The improvements of the invention substantially decrease the injury to the peripheral-wall inner surface 16, improve the sealing and increase the operating life of the engine.

While I have described my invention in detail in its present preferred embodiment it will be obvious to those skilled in the art after understanding my invention that various changes and modifications may be made therein without departing from the spirit or scope thereof.

What is claimed is:

1. A rotary mechanism comprising an outer body having spaced end walls and a peripheral wall forming a cavity therebetween, with the inner surface of said outer-body peripheral wall having a multilobed profile; said outer body having an axis along which said end walls are spaced; an inner body disposed within said outer body for eccentric rotation relative to said outer body; said inner body having a plurality of circumferentially-spaced apex portions about its outer periphery, with each apex portion having an outwardly-facing groove running from one end face to the other of the inner body; an apex seal means received within each apex groove and being outwardly movable; each said apex seal means having an outer edge in contact with the inner surface of said peripheral wall for sealing co-operation therewith; the plural apex seal means forming a plurality of working chambers between said bodies which vary in volume upon relative rotation of said bodies; each apex seal means differing from any other apex seal means in the mass of the apex seal means.

2. A rotary mechanism comprising an outer body having spaced end walls and a peripheral wall forming a cavity therebetween, with the inner surface of said outer-body peripheral wall having a multilobed profile; said outer body having an axis along which said end walls are spaced; an inner body disposed within said outer body for eccentric rotation relative to said outer body; said inner body having a plurality of circumferentially-spaced apex portions about its outer periphery, with each apex portion having an outwardly-facing groove running from one end face to the other of the inner body; an apex seal means received within each apex groove and being outwardly movable; each said apex seal means having an outer edge in contact with the inner surface of said peripheral wall for sealing co-operation therewith; the plural apex seal means forming a plurality of working chambers between said bodies which vary in volume upon relative rotation of said bodies; each apex seal means differing from any other apex seal means in the circumferential spacing between the outer edge of the apex seal means and the outer edges of adjacent apex seal means.

3. A rotary mechanism comprising an outer body having spaced end walls and a peripheral wall forming a cavity therebetween, with the inner surface of said outer-body peripheral wall having a multilobed profile; said outer body having an axis along which said end walls are spaced; an inner body disposed within said outer body for eccentric rotation relative to said outer body; said inner body having a plurality of circumferentially-spaced apex portions about its outer periphery, with each apex portion having an outwardly-facing groove running from one end face to the other of the inner body; an apex seal means received within each apex groove and being outwardly movable; each said apex seal means having an outer edge in contact with the inner surface of said peripheral wall for sealing cooperation therewith; the plural apex seal means forming a plurality of working chambers between said bodies which vary in volume upon relative rotation of said bodies; each apex seal means differing from any other apex seal means in the tilt angle of the apex seal means as measured from the longitudinal centerline of the cross-section of each apex seal means to a radial line from the inner body center to the outer edge of said apex seal means.

4. A rotary mechanism as recited in claim 3, in which said inner body has an intermediate seal element received within each inner-body apex groove at each end of said groove for sealing engagement with the adjacent end of an apex seal means; said intermediate seal elements being equally spaced circumferentially about said inner body.

5. The combination recited in claim 4, having spring means received within each rotor apex groove for urging the associated apex seal means generally radially outward of said groove for sealing engagement with said peripheral-wall inner surface; each said spring means differing from any other spring means in resiliency.

No references cited.